UNITED STATES PATENT OFFICE.

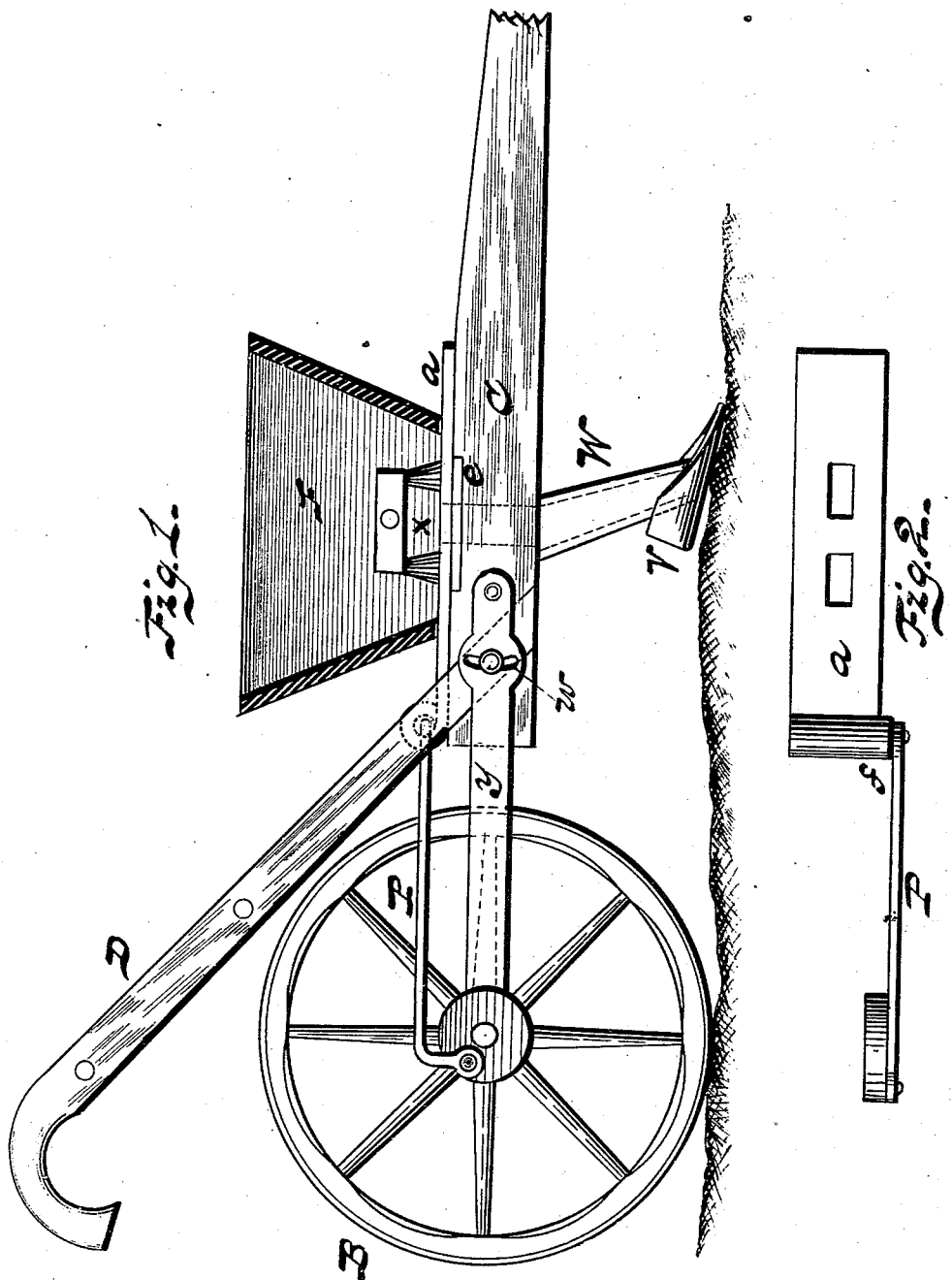

ELISHA SPILLER, OF AMITE CITY, LOUISIANA.

SEED-PLANTER.

SPECIFICATION forming part of Letters Patent No. 279,037, dated June 5, 1883.

Application filed June 15, 1882. (No model.)

*To all whom it may concern:*

Be it known that I, ELISHA SPILLER, a citizen of the United States of America, residing at Amite City, in the parish of Tangipahoa and State of Louisiana, have invented certain new and useful Improvements in Seed-Planters for Corn, Peas, &c., in Hills, of which the following is a specification, reference being had therein to the accompanying drawings.

My invention relates to improvements in seed-planters, and especially applies to that class of planters which are used for corn, cotton-seed, and other small grains which are planted in hills at regular distances apart; and it consists in a peculiar construction of the same, to be hereinafter described.

It further consists in the peculiar construction of the plow, which operates both as a furrow-opener and grain-coverer.

In the drawings, Figure 1 is a side view of my planter. Fig. 2 shows the eccentric-rod and feed-slide detached.

I construct my planter provided with the usual beam, C, wheel B, handles D, and hopper F. The axle of the wheel is in the plane of the beam, and on the projecting end of this axle, or on the wheel, I place an eccentric, which, by means of its rod P, operates a slide in the bottom of the grain box or hopper. The grain-box is placed on the top of the beam, as is quite commonly done, and working in its bottom is a slide, a, having two openings through it to allow the passage of the grain. These openings communicate by a hole through the beam with the hollow shaft or standard W, which carries the plow and discharges the grain immediately behind the plow in the furrow it has made, and the wings of the plow carry the earth back into the furrow and cover the seed.

Within the hopper, and directly over the center of the slide, is placed a removable brush-block, x, having a brush on each side thereof, which cuts off the proper amount of seed to be fed to each hill and prevents the openings becoming clogged. The brush-block is attached to the sides of the hopper by screws or analogous means, so as to be easily removable.

The plow V may be made separate and attached to the standard in the usual manner, or may be cast in one piece with the standard. It is of peculiar construction, having at each side a wing formed by the upward bending of the corners, and the opening of the wings being narrower in rear than in front causes the earth loosened and raised by the point to pass backward on each side of the foot or standard, between the wings, and cover the grain. The plow has a hollow shank, which receives or is part of the standard, as they are cast separate or in one piece.

Upon the beam of the planter, below the hopper, is a thin metal plate, e, attached by screws, having through it a single opening large enough to pass the grain in one of the openings in the slide a, which slide works just over it, and the stationary brush x, as the slide moves, will cut off alternately, and the filled opening in a will come over the opening in e and discharge its contents, which pass down through the hollow standard. The brush-block is a wooden or metallic plate extending across the hopper, just above the slide, and having brushes of bristles or fine wire on each side. Slides having different-sized openings will be provided for grains of different sizes. By having thin plates of sheet metal, which partially close the openings in the slide a, and which are adjusted by a thumb-screw, the openings may be regulated to feed any size or amount of grain to each hill.

The wheel is connected with the beam by arms y, pinned or bolted to the outsides of the beam, near the rear end of the same, and bearing the ends of the axle at the rear. Vertical slots w in these arms, a short distance from the pins or bolts, receive the ends of rests in the sides of the beam and allow a vertical play of several inches without raising the wheel from the ground. The handles are attached to the beam in mortises, and being flush with the sides of the beam allow the arms y to pass over them without obstruction. The slide a is operated by an eccentric-rod, P, from the eccentric on the wheel B. This rod hooks into a projection, f, on the rear end of the slide, and can be easily detached to change or remove the slide.

The operation is as follows: The revolution of the wheel B causes a movement of the eccentric and rod, which communicates an alternate motion to the slide a, and as the holes in the slide pass out under the brush each in turn fills with seed, and as it returns will discharge its contents in the rear of the plow, and the continuous stream of loose earth passing between the wings will cover the seed.

I design using this planter interchangeably in connection and combination with the drill-planter patented by me May 16, 1882.

Having thus described my invention and discovery, what I claim therein as new, and desire to secure by Letters Patent, is—

In a seed-planter, the combination, with a hopper having a single central opening in its bottom and a single seed-delivery tube, of the beam C, adjustably secured by slotted arms to the axle, and the cut-off plate $a$, provided with two openings to the grain-delivery tube and actuated by a rod eccentrically secured to the drive-wheel, substantially as and for the purpose set forth.

In testimony whereof I affix my signature in presence of two witnesses.

ELISHA SPILLER.

Witnesses:
E. F. RUSSELL,
W. B. KEMP.